United States Patent [19]

Miller et al.

[11] 4,138,629

[45] Feb. 6, 1979

[54] FIELD COMPENSATED MOTOR/GENERATOR

[75] Inventors: Robert A. Miller, Fareham; Geoffrey E. Davis, Locksheath, both of England

[73] Assignee: Plessey Handel und Investments AG, Zug, Switzerland

[21] Appl. No.: 739,004

[22] Filed: Nov. 4, 1976

[30] Foreign Application Priority Data

Nov. 6, 1975 [GB] United Kingdom ............... 46014/75

[51] Int. Cl.$^2$ ............................................. H02P 7/66
[52] U.S. Cl. .................................. 318/140; 310/113; 310/198
[58] Field of Search ................... 310/112–114, 310/68, 68 D, 198, 200, 201, 180, 202, 204, 205, 203, 206, 207, 179, 208, 155, 166, 158, 186, 184; 318/140, 151, 152, 153, 154, 68 A; 322/29

[56] References Cited

U.S. PATENT DOCUMENTS

| 744,145 | 11/1903 | Wiard | 310/184 |
|---|---|---|---|
| 2,179,561 | 11/1939 | Oesterlein | 310/113 |
| 2,652,507 | 9/1953 | Kalikow | 310/112 |
| 2,679,606 | 5/1954 | Baudry | 310/112 |
| 2,722,652 | 11/1955 | Brainard | 310/113 |
| 3,237,034 | 2/1966 | Krasnow | 310/198 |
| 3,344,338 | 9/1967 | Sparrow | 310/179 |
| 3,531,672 | 4/1970 | King | 310/180 |
| 3,577,002 | 5/1971 | Hall | 310/113 |
| 3,809,914 | 5/1974 | Kilgore | 322/29 |
| 3,809,937 | 5/1974 | Kolke | 310/184 |
| 4,019,104 | 4/1977 | Parker | 310/113 |

Primary Examiner—R. Skudy
Attorney, Agent, or Firm—Fleit & Jacobson

[57] ABSTRACT

A rotary electric motor/generator comprising a stator assembly including a single stator having a motor energizing winding and a generator output winding carried by the stator. A rotor is provided rotatable relative to the stator assembly, and includes a rotor winding carried by said rotor. The generator output winding is interconnected with the rotor winding to compensate for rotor reaction when the motor/generator is operating as a motor.

16 Claims, 5 Drawing Figures

FIELD COMPENSATED MOTOR/GENERATOR

This invention relates to rotary electric machines and relates more specifically to a rotary electric machine in the form of a motor/generator such as, for example, a starter/generator.

There are many applications where a rotary electric machine in the form of a starter-generator is required. In such machines, when used in the starter mode it is usual to make use of a conventional d.c. armature winding with associated commutator and brush gear but in the generator mode, because the brush gear and commutator have only a relatively short life, it is advantageous to arrange that the brush gear is moved out of contact with the commutator and to operate the machine as a brushless alternator. Due to the machine being used in the generator mode as a brushless alternator, it is not possible to use a salient pole field structure and this is disadvantageous when the machine is used in the starter mode especially in highly loaded-heavy current applications since its commutation performance is reduced.

According to the present invention there is provided a rotary electric machine in the form of a motor/generator comprising a stator assembly having a generator winding which in the motoring mode of the machine acts as a field compensating winding.

In this way armature reaction is neutralised and improved commutation performance is obtained. By making use of the generator winding to effect field compensation, a weight, cost and size advantage is obtained over a two winding system.

In carrying out the invention it may be arranged that the stator winding includes a stator having a non-salient pole field structure, the stator being of hollow generally cylindrical form and being provided on its inside surface with a plurality of axial slots which between them afford a plurality of inwardly projecting poles around the stator periphery.

In one preferred arrangement the inwardly projecting poles will be equi-spaced, the generator winding taking the form of a uniformly distributed stator winding disposed around the stator periphery.

In carrying out the invention according to the said one preferred arrangement the uniformly distributed stator winding may be formed from a plurality of sub-windings, one sub-winding being associated with each of the inwardly projecting poles, the plurality of sub-windings being interconnected in accordance with a predetermined interconnection pattern which is dependent upon the number of motor poles thereof, the number of generator poles thereof and the number of phases of the generated output.

In one arrangement field winding means may be provided in a plurality of said slots, the field winding means conveniently taking the form of two pairs of diametrically opposed field windings disposed in spaced relationship around the stator periphery.

Conveniently interpole winding means is provided between adjacent ones of the field windings.

In another preferred arrangement it will be arranged that the machine according to the invention comprises a rotor assembly rotatable within the stator assembly, a rotor winding carried by said rotor assembly, commutator means associated with the rotor assembly and connected to the rotor winding, brush means movable into and out of contact with the commutator means, brush lowering means associated with the brush means, the machine being operated in its motoring mode as a compound motor and in its generator mode as a brushless alternator.

In carrying out the invention according to the said another preferred arrangement, exciter means may be provided for energising the rotor winding when in its generator mode, the exciter means conveniently comprises an exciter generator.

Conveniently rectifier means will be provided for rectifying the output of the generator winding, and control means may be provided to which the rectified output is applied, the control means being effective for controlling the exciter means for regulating the voltage of the rectified output.

An exemplary embodiment of the invention will now be described, reference being made to the accompanying drawings, in which.

Figure 1:
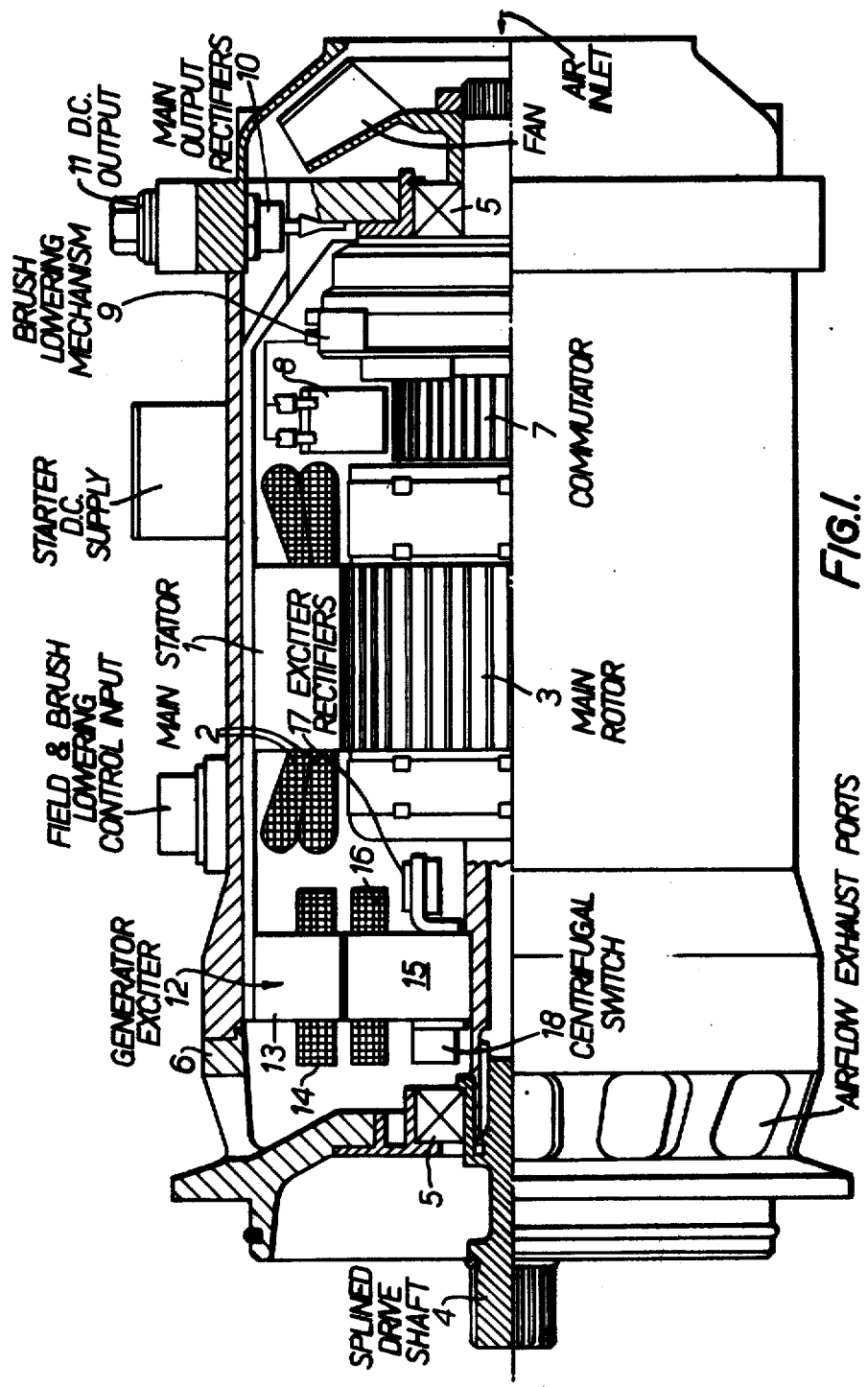
FIG. 1 is a part sectional view of a starter/generator in accordance with the present invention.

Considering the starter/generator shown in FIG. 1 of the drawings, this consists of a main stator 1 carrying stator windings 2 typically consisting of both series and shunt field windings and a main rotor or armature carrying conventional conventional armature windings (not shown). The main armature 3 is carried on a central drive shaft 4 which is supported between end bearings 5 carried by the outer casing 6 of the starter/generator. The main armature 3 is also provided with a commutator 7 which operates in conjunction with commutator brushes, one of which is shown at 8, which are normally arranged to be lifted clear of the commutator 7 but which, under the operation of a brush lowering mechanism 9 can in the starter mode of the starter/generator be lowered into contact with the commutator 7. The output afforded by the main rotor winding (not shown) is connected via main output rectifier 10 to a d.c. output terminal 11.

In order to effect energisation of the main rotor or armature 3 when in the generator a separate exciter 12 is provided which consists of an exciter stator 13 carrying an exciter field winding 14 and an exciter armature 15 mounted on the drive shaft 4 and carrying an exciter armature winding 16. Also mounted on the exciter armature 15 so as to be rotatable therewith are exciter rectifiers 17 to which the output from the exciter armature windings 16 are applied, and also a centrifugal switch 18 which is connected to the exciter rectifier 17 as will be described in greater detail with reference to the circuit diagram of FIG. 2.

Figure 2:
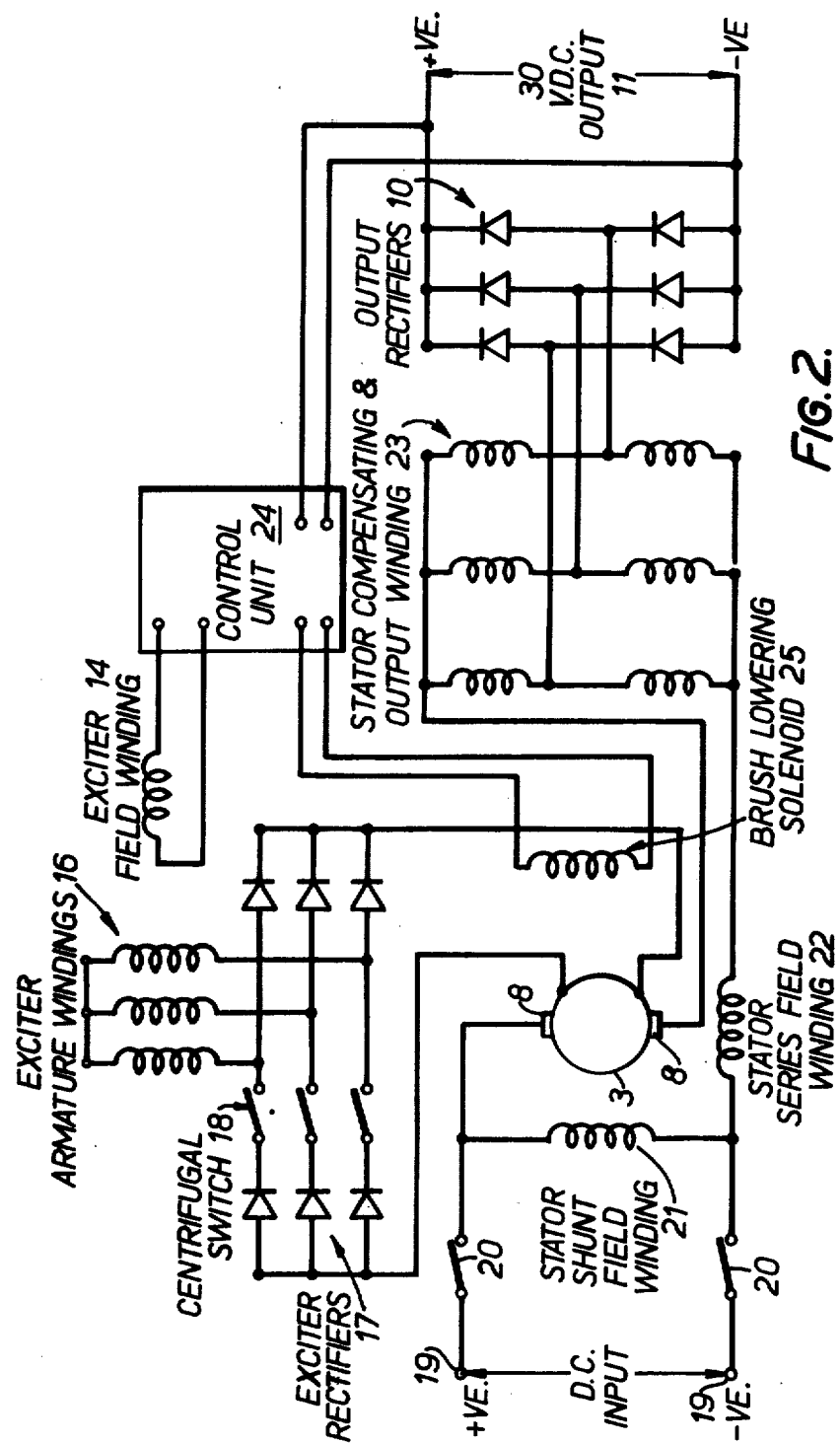
FIG. 2 is a circuit diagram of the starter/generator of FIG. 1.

In the circuit diagram of the starter/generator shown in FIG. 1, various parts that correspond with those already referred to in connection with FIG. 1 will be accorded the same reference numerals. In FIG. 2, the main armature 3 is diagrammatically shown together with two brushes 8 which act on the commutator part 7 (not shown in FIG. 2) of the main armature 3. The brushes 8, when they are in their lowered condition, make contact with the main armature winding (not shown) and connect it to a d.c. supply 19 via on/off switches 20 and also via a main stator shunt field winding 21, a main stator series field winding 22 and a three phase stator compensating and output winding 23.

When operating in its starter mode, the switches 20 are closed, and simultaneously an output is afforded from a control unit 24 to a brush lowering solenoid 25 which causes the brushes 8 to be lowered into contact with the commutator 7 (FIG. 1). The machine is then run as a compound motor with the stator compensating and output winding 23 used to compensate for the non-salient pole field structure as will be more fully described with reference to FIGS. 3 to 5 of the drawings.

In order to operate the starter/generator of FIG. 2 as a brushless alternator, the generator exciter 12 (FIG. 1) is provided thus comprising an exciter field winding 14 which is supplied with d.c. from the control unit 24, and a three phase exciter armature winding 16, the outputs from which are rectified by means of three pairs of exciter rectifiers, each pair of which has a centrifugally operated switch 18 connected in series therewith, the rectified output being applied to tappings on the main armature winding (not shown) to produce a non-salient pole alternator field. Ideally, the tappings on the main armature winding (not shown) will be spaced apart by an amount corresponding to 2-pole pitches, but the centrifugal switches 18 are provided so as to open circuit the pairs of exciter rectifiers 17 should a potential be developed across the tappings when the machine is used in the starter mode. The rotating non-salient pole alternator field thus afforded by the rotating main armature 3 causes an e.m.f. to be induced into the three-phase stator compensating and output winding 23, the outputs from which are rectified by means of three pairs of output rectifier 10 to afford a d.c. output, typically at 30 volts, 11. The d.c. output 11, is also applied to the control unit which controls, via an electronic regulator (not shown), the current applied to the exciter field winding 14 in order to regulate the voltage of the d.c. output 11.

Overall operation of the starter/generator described with reference to FIGS. 1 and 2 is as follows:

In the starter mode the switches 20 are closed and the brush lowering solenoid 25 is operated to cause the brushes 8 to contact the commutator 7 (FIG. 1) and the machine is run as a compound motor, the centrifugal switches 18 being normally open.

As the speed increases, the centrifugal switches 18 operate to apply d.c. to the exciter armature winding (not shown) and energisation of the brush lowering solenoid 25 is discontinued to cause the brushes 8 to be lifted clear of the commutator 7 (FIG. 1). The machine now operates as a brushless alternator which produces d.c. power at the d.c. output 11.

By arranging that armature compensation is afforded by the generator output winding 23 when in the starter mode, the disadvantage that the main stator field does not have salient poles and will be considerably distorted by armature reaction is at least partially offset. By using a single winding for both modes of operation, a weight, size and cost saving is achieved compared with the provision of two separate windings to achieve the same purpose.

Figure 3:
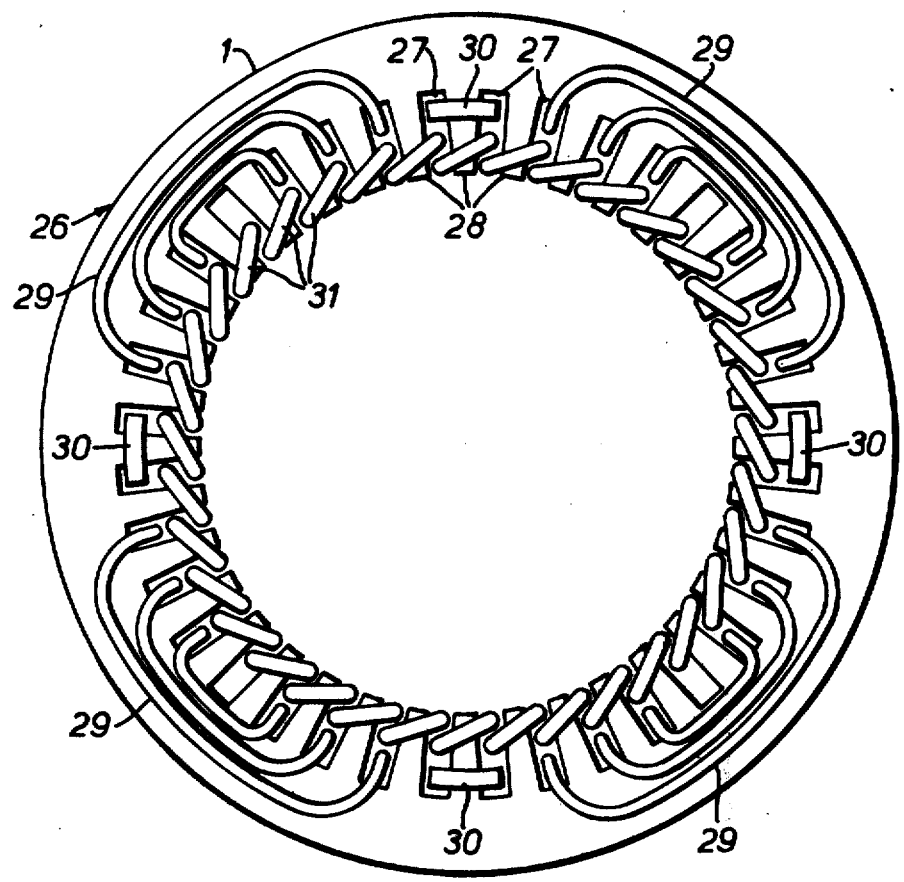
FIG. 3 depicts, somewhat diagrammatically, the stator configuration of the starter/generator of FIGS. 1 and 2.
Figure 4:
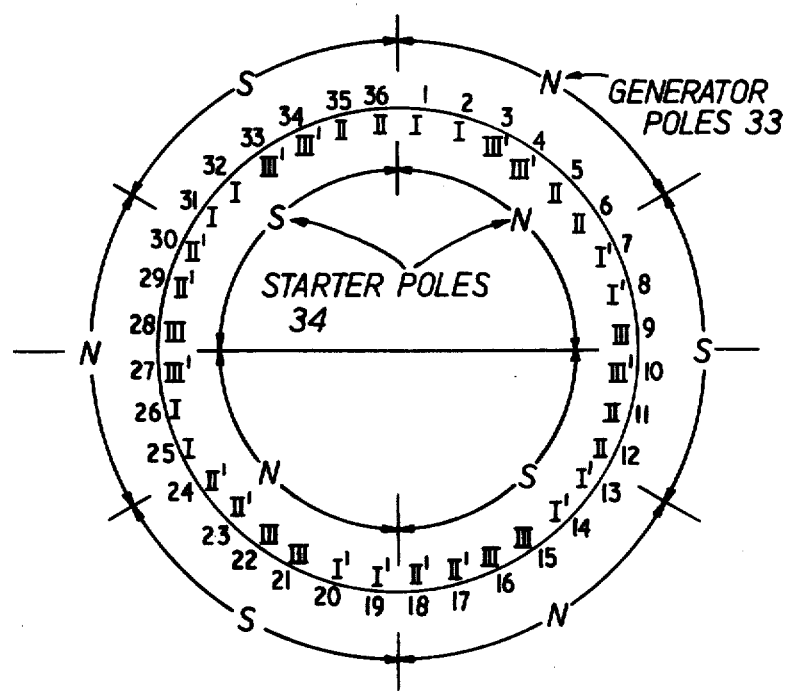
FIG. 4 depicts the connection scheme for the compensating and generator winding of FIG. 3.
Figure 5:
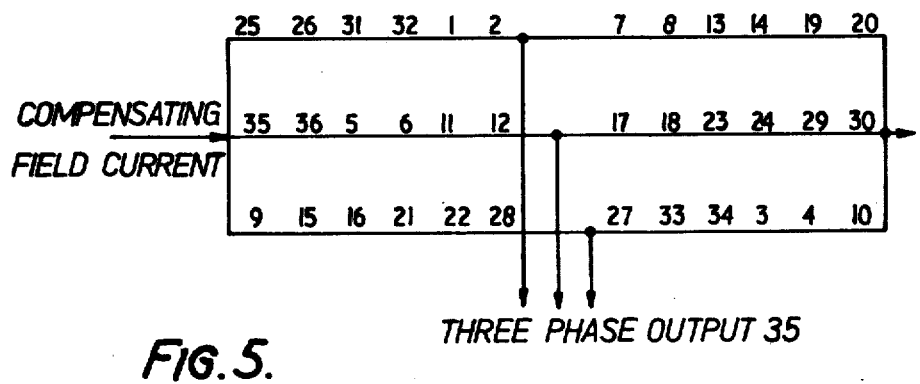
FIG. 5 depicts the interconnection pattern for the compensating and generator windings of FIGS. 3 and 4.

In FIGS. 3 to 5 of the drawings, the main stator configuration of the starter/generator described with reference to FIGS. 1 and 2 of the drawings is depicted in greater detail, the example to be described having a stator compensating and and output winding 23 which is interconnected so as to provide a 4-pole armature compensating winding and a 6-pole three-phase generator output winding. It should be appreciated however that any convenient pole combination configuration may be obtained e.g. 4-pole motor and 2-pole generator using similar interconnection principles.

In FIG. 3 of the drawings there is shown an end view of the main stator 1 of the starter/generator of FIG. 1. This consists of a hollow generally cylindrical stator 26 which is provided on its inside surface with 36 axial slots 27 which form between them 36 equi-spaced inwardly projecting poles 28. Disposed in some of the slots 27 so as to surround some of the poles 28 are two pairs of diametrically disposed field windings 29 which are constituted by the shunt field winding 21 and series field winding 22 of the starter/generator of FIG. 2. Between adjacent pairs of the field windings 29 are disposed interpole windings 30 of conventional form and around each of the poles 28 is disposed a sub-winding 31 which are interconnected, as will be described with reference to FIGS. 4 and 5 so as to constitute a 4-pole armature compensating winding and a 6-pole three-phase generator output winding.

In FIG. 4 of the drawings, the 36 slots 27 of FIG. 3 are numbered 1 to 36 respectively around the periphery of a circle 32 which corresponds to the inner surface of the stator 1 of FIG. 3. Associated with each of the slots 27 is a Roman numeral I, I', II, II', III or III' which indicate the phases to which the sub-winding 31 in that slot belongs. Also indicated in FIG. 4 are the generator poles 33 and starter poles 34 afforded by the arrangement of FIG. 3.

In FIG. 5 of the drawings, there is depicted the interconnection pattern for the sub-windings 31 of FIG. 3. Viewed as a three-phase output for a 6-pole generator, the sub-windings 27 associated with the particular slots enumerated 1 to 36 in FIG. 4 are connected in the order shown in FIG. 5 into two star connected groups which are effectively in parallel as far as the three-phase output 35 is concerned, the two star points therefore assuming the same potential in the generating mode and so could be connected together, if necessary, in that mode. Viewed as an armature compensating winding for a 4-pole motor, the sub-windings 31 associated with the particular slots enumerated 1 to 36 in FIG. 4 are into three parallel groups in the order shown in FIG. 5, so that one third of the armature current flows through each group from left to right as viewed in FIG. 5.

From the foregoing it may be appreciated that a single stator winding may be provided which provides compensation of the armature m.m.f. when the machine operates as a motor with $P_1$ poles and provides a balanced polyphase output when the machine operates as a generator with $P_2$ poles. Although in the embodiment described with reference to FIGS. 3 to 5, a machine in which $P_1 = 4$ and $P_2 = 6$ was considered in relation to a stator having 36 slots, it should be appreciated that other combinations e.g. a 4-pole motor with a 2-pole generator accommodated in 24 slots may equally well be used. In general the number of stator slots should be a multiple of $P_1$, $P_2$ and the number of phases of the output windings. In practice, there may be limitations on the number of stator slots, depending upon the physical dimensions of the machine. Further limitations may arise from the performance requirements for the machine. For example, the design of the armature winding governs the number of turns in the stator winding if it is to provide 100% or nearly 100% compensation, and the number of stator turns will directly govern the e.m.f.

which may be generated at the minimum generating speed. If this differs substantially from the e.m.f. required, the basic scheme (of which FIG. 5 is an example) may be amenable to modification so as to effect a better match of the e.m.fs.

Although in the starter generator described with reference to the accompanying drawings, a separator exciter has been provided for providing energisation of the main armature when in the generator mode, in some applications it may be convenient to effect energisation of the main armature using slip rings in which case the separate exciter may be dispensed with. Also instead of tapping into the actual armature winding, it may be convenient to provide a separate generator field winding on the armature. These and other modifications may be made to the starter/generator described without departing from the basic principle of the invention.

What we claim is:

1. A rotary electric motor/generator comprising a stator assembly including a single stator, a motor energizing winding and a generator output winding carried by said single stator, a rotor rotatable relative to said stator assembly, a rotor winding carried by said rotor, and means, associated with said generator output winding and said rotor winding, for compensating for rotor reaction by causing an interconnection between said generator output winding and said rotor winding when said motor/generator is operating as a motor.

2. A machine as claimed in claim 1, in which the single stator has a non-salient pole field structure.

3. A machine as claimed in claim 2, in which the stator is of hollow generally cylindrical form, the stator being provided on its inside surface with a plurality of axial slots which between them afford a plurality of inwardly projecting poles around the stator periphery.

4. A machine as claimed in claim 3, in which the inwardly projecting poles are equi-spaced.

5. A machine as claimed in claim 4, in which the generator winding takes the form of a uniformly distributed stator winding disposed around the stator periphery.

6. A machine as claimed in claim 5, in which the uniformly distributed stator winding is formed from a plurality of sub-windings, one sub-winding being associated with each of the inwardly projecting poles.

7. A machine as claimed in claim 6, in which the plurality of sub-windings are arranged in particular groups, each said group including a number of said sub-windings to form a number of motor poles and a number of generator poles.

8. A machine as claimed in claim 3, in which field winding means is provided in a plurality of said slots.

9. A machine as claimed in claim 8, in which the field winding means takes the form of two pairs of diametrically opposed field windings disposed in spaced relationship around the stator periphery.

10. A machine as claimed in claim 9, in which interpole winding means is provided between adjacent ones of the field windings.

11. A machine as claimed in claim 1, comprising commutator means associated with the rotor assembly and connected to the rotor winding, brush means movable into and out of contact with the commutator means, brush lowering means associated with the brush means for moving said brush means, whereby forming a compound motor and a brushless alternator.

12. A machine as claimed in claim 11, comprising exciter means for energising the rotor winding when in its generator mode.

13. A machine as claimed in claim 12, in which the exciter means comprises an exciter generator.

14. A machine as claimed in claim 11 comprising rectifier means for rectifying the output of the generator winding.

15. A machine as claimed in claim 14, comprising control means to which the rectified output is applied, the control means being effective for controlling the exciter means for regulating the voltage of the rectified output.

16. A motor/generator as claimed in claim 1, wherein said interconnection is a series connection between said generator output winding and said rotor winding when said motor/generator is operating as a motor.

* * * * *